(12) United States Patent
Ghio (10) Patent No.: US 12,120,995 B2
(45) Date of Patent: Oct. 22, 2024

(54) SYSTEM FOR THE VEGETABLE GARDEN AND NURSERY CULTIVATION OF PLANTS

(71) Applicant: GERMINA S.R.L., Carrara (IT)

(72) Inventor: Marco Ghio, Carrara (IT)

(73) Assignee: GERMINA S.R.L., Carrara (IT)

(*) Notice: Subject to any disclaimer, the term of this patent is extended or adjusted under 35 U.S.C. 154(b) by 77 days.

(21) Appl. No.: 17/998,393

(22) PCT Filed: Feb. 2, 2021

(86) PCT No.: PCT/IB2021/050811
§ 371 (c)(1),
(2) Date: Nov. 10, 2022

(87) PCT Pub. No.: WO2021/229310
PCT Pub. Date: Nov. 18, 2021

(65) Prior Publication Data
US 2023/0172118 A1    Jun. 8, 2023

(30) Foreign Application Priority Data
May 15, 2020 (IT) .................. 102020000011161

(51) Int. Cl.
*A01G 31/06* (2006.01)
*A01G 7/04* (2006.01)
(Continued)

(52) U.S. Cl.
CPC ............ *A01G 9/023* (2013.01); *A01G 7/045* (2013.01); *A01G 9/246* (2013.01); *A01G 9/247* (2013.01); *A01G 9/249* (2019.05)

(58) Field of Classification Search
CPC .......... A01G 9/24; A01G 9/249; A01G 9/246; A01G 9/247; A01G 31/06
See application file for complete search history.

(56) References Cited

U.S. PATENT DOCUMENTS

| | | | |
|---|---|---|---|
| 4,255,897 A * | 3/1981 | Ruthner | A01G 9/24 47/DIG. 6 |
| 10,238,046 B2 * | 3/2019 | Wu | A01G 7/045 |

(Continued)

FOREIGN PATENT DOCUMENTS

| | | |
|---|---|---|
| CN | 210324369 U | 4/2020 |
| JP | H01256325 A | 10/1989 |

OTHER PUBLICATIONS

International Search Report and Written Opinion for PCT/IB2021/050811 mailed May 28, 2021.

*Primary Examiner* — Kristen C Hayes
(74) *Attorney, Agent, or Firm* — Perilla Knox & Hildebrandt LLP; Kenneth A. Knox (57) ABSTRACT

A system for vegetable garden and nursery cultivation of plants is described that includes a cabinet comprising a plurality of shelves on which to cultivate plants. The shelves are being positioned one on top of the other along a vertical axis, so as to identify a space interposed between the upper face of a shelf and the lower face of the overlying shelf. The space is adapted to cultivate the plants. Further, means for generating a light source, means for delivering a liquid, and means for suction/supply of a forced air flow are provided. Further, means for moving the shelves along the vertical axis are included, there being a control unit configured to control operation of the means for moving, the means for generating the light source, the means for delivering the liquid, and the means for suction/supply.

20 Claims, 7 Drawing Sheets

(51) Int. Cl.
*A01G 9/02* (2018.01)
*A01G 9/24* (2006.01)

(56) References Cited

U.S. PATENT DOCUMENTS

| | | | |
|---|---|---|---|
| 2012/0060416 A1* | 3/2012 | Brusatore | A01G 31/06 47/62 A |
| 2017/0099791 A1* | 4/2017 | Joseph | A01G 22/25 |
| 2018/0007850 A1* | 1/2018 | Dufresne | B65G 1/026 |
| 2019/0133062 A1 | 5/2019 | Joseph et al. | |
| 2021/0029894 A1* | 2/2021 | Zhan | A01G 9/088 |
| 2021/0204499 A1* | 7/2021 | Fujisawa | A01G 31/06 |

* cited by examiner

SYSTEM FOR THE VEGETABLE GARDEN AND NURSERY CULTIVATION OF PLANTS

CROSS-REFERENCE TO RELATED APPLICATIONS

This application is a national phase application under 35 U.S.C. § 371 of International Application No. PCT/IB2021/050811 filed Feb. 2, 2021 entitled. "SYSTEM FOR THE VEGETABLE GARDEN AND NURSERY CULTIVATION OF PLANTS," which claims the benefit of and priority to Italian Patent application Ser. No. 10/202,0000011161 filed May 15, 2020, the contents of each of which being incorporated by reference in their entireties herein.

The present invention relates to a system for the vegetable garden and nursery cultivation of plants, comprising a cabinet in which a plurality of shelves is provided on which to cultivate said plants.

The shelves are positioned one on top of the other, along a vertical axis, so as to identify a space interposed between the upper face of a shelf and the lower face of the overlying shelf, which space is adapted to cultivate plants.

Means for generating a light source, means for delivering a liquid and means for sucking/supplying a forced air flow are also included.

The present invention relates in particular to all systems in the vegetable garden and nursery field, for the cultivation of any kind of plant, currently carried out inside agricultural greenhouses.

In fact, agricultural greenhouses have the main objective of maximising the yield of a production even where the environmental conditions are not favourable.

Each environmental parameter inside the greenhouse should be consistent with the optimal conditions for the growth and the cultivation of the crop selected according to a delicate microclimatic balance.

For this purpose, greenhouses are commonly provided with a heating or cooling system, possibly automatic, which intervenes when temperatures are below or above those required and especially suitable for the growth of the species being cultivated.

Likewise, greenhouses are often equipped with dehumidification/humidification systems which intervene if non-optimal humidity values are detected to ensure a healthy development of the crop and to avoid the development of fungi, moulds or the proliferation of pathogens.

Given the necessarily essential structure of a greenhouse, the addition/removal of heat required by a greenhouse depends not only on the type of production therein, but also on the dimensions in volume and the heat leakage of the structure itself.

For this reason, state-of-the-art agricultural greenhouses have low energy efficiency.

Consequently, the cost of maintaining an optimal environment in a greenhouse is often high, with negative repercussions on the production costs of the cultivated goods.

Currently, to try to solve the energy consumption problems of greenhouses known in the state of the art and to obtain "home-grown" cultivations, greenhouses have been developed to be placed inside closed environments.

Such greenhouses are made in a manner similar to that described above, i.e., they comprise a cabinet with shelves on which the plants are cultivated.

Inside the cabinet, the plants to be cultivated are subjected to hydration, lighting and control of the conditioning, temperature and humidity, so as to create an optimal environment to allow the growth of the plants.

Such greenhouses do indeed allow to limit energy waste, but they present additional problems.

In fact, the greenhouses are typically intended for indoor use and must therefore have reduced dimensions, resulting in limited plant production.

In fact, the production of the plants clashes with the presence of the shelves, which must be sufficiently spaced, in order to ensure the correct growth in height of the plants themselves.

The greenhouses known in the state of the art are therefore difficult to adapt to the different types of plants to be cultivated and do not allow to obtain efficient crops from the point of view of yield, i.e., the quantity of products.

There is therefore a need which is not satisfied by the state of the art to provide a System for the vegetable garden and nursery cultivation of plants which overcomes the above-described disadvantages.

The present invention achieves the above objects by providing a system as previously described, in which movement means of the shelves along the vertical axis are included.

A control unit is also present, configured to control the operation of said movement means, said light source generation means, said liquid delivery means and said forced air flow suction/supply means.

In accordance with such a configuration, a reconfigurable system is obtained, in which it is possible to move the shelves based on the state of growth of the plants.

As will be seen in the following, the volume enclosed between one shelf and the other identifies an environment with a specific and different climate for each shelf.

It is therefore clear how it is possible to diversify the growth states of each shelf, so as to move such shelves during the plant growth process, to optimize the internal space of the cabinet with respect to the number of cultivations.

The system object of the present invention allows to recreate in any season the optimal environmental features for the plants and flowers being cultivated.

In fact, the means described allow to create an optimal natural environment and minimise the consumption of energy used as a function of the growth phase of the cultivated plant.

Advantageously, the system comprises sensors adapted to detect the brightness and/or temperature and/or humidity within the space interposed between the shelves.

A fully automated system is therefore obtained, in which it is possible to set the type of plants associated with each shelf and the control unit will move the shelves and recreate the microclimate necessary for the growth of the plants within the various environments.

According to a preferred embodiment, the movement means comprise one or more slides integral with the shelves running along corresponding tracks included in the walls of the cabinet.

The further variants which will be described in the following are intended to optimise the construction features of the system object of the present invention and to provide the best compromise between system performance and the dimensions thereof.

A peculiar aspect of the system object of the present invention is the possibility of optimising the use of the cultivated space inside the cabinet and obtaining the maximum number of plants cultivated on the shelves.

According to an improvement, each shelf consists of a tank element, which has a double bottom, which double bottom provides a lower wall with a plurality of holes suitable for the introduction/suction of air.

The double bottom may also have nozzles adapted to deliver the liquid in the area below the shelf.

Each shelf will therefore be responsible for the cultivation environment of the shelf below and will provide such shelf with the necessary water, temperature and light.

Alternatively or in combination with what is described, it is possible to include the liquid delivery nozzles at the bottom of the tank element, so as to spray the cultivations of the shelf itself and not the one below.

Regardless of the configuration of the delivery nozzles, the control unit can in fact have processor means on which to load software containing information related to the different plants.

It follows that the control unit will be able to adjust the operation of the various means belonging to the system in order to provide the necessary humidity, temperature and volume, based on the cultivations of each shelf and during the entire growth process.

As will be described below, the presence of the double bottom allows to house the various pipes/connections which allow the introduction/suction of air and/or the delivery of liquid and/or the emission of light.

Alternatively or in combination with what has been described, the suction of the exhaust air may be included through a plurality of holes in the bottom of the tank element, so as to create a different air circulation from the upper shelf to the shelf below.

In fact, according to a preferred embodiment, the forced air flow suction/supply means comprise pumping means connected to one or more introduction/suction pipes, which pipes are partly housed inside the double bottom and are in communication with the holes suitable for the introduction/suction of air.

Preferably, the system includes the separation of the air introduction circuit, with respect to the air suction circuit.

For this reason at least one introduction pipe and at least one suction pipe are included, which are connected to corresponding introduction holes and suction holes.

According to an embodiment, the light source generation means comprise a cable connecting an electricity generation unit to one or more lighting devices.

The connection cable is partly housed inside the double bottom, while the lower wall of the double bottom includes an insertion seat of said one or more lighting devices.

Finally, the system object of the present invention can include that the liquid delivery means comprise a delivery pipe connected to the nozzles, which delivery pipe is partly housed inside said double bottom, in the case of top-down delivery. In this case, the nozzles are preferably included at the insertion location of the lighting devices.

In the event of delivery at the cultivation level, such nozzles are included at the soil layer of the shelf.

As anticipated, one of the objects of the system object of the present patent application is the optimisation of the cultivated volume with respect to the total number of cultivations.

During the plant's evolutionary process, the plant itself may require more or less soil, generally starting from a minimum layer of soil during the initial phases, to increase the amount of soil during growth.

However, automated systems such as the greenhouse object of the present patent must precede the amount of soil needed for the entire plant process already from the initial phases.

With a view to optimising the spaces, it is particularly disadvantageous to occupy the shelves with such an amount of soil.

For this reason advantageously in the system object of the present invention, each tank element comprises at least one layer of lyophilised soil contained inside a container of water-soluble polymeric material.

Thanks to such a configuration, the thickness and bulk of the soil is limited, which increases only in the moment when the shelf, i.e., the tank element, is hydrated, the container dissolves and the soil increases in volume.

Finally, it is specified that the system object of the present invention includes modular tank elements, i.e., capable of increasing dimensions based on the amount of soil present inside the tank.

Some possible embodiments will be described in the following, but preferably the tank element of each shelf has one or more extendable walls.

According to a further embodiment, each compartment belonging to the system object of the present invention includes a door which adapts as a function of the size of the compartment.

Compartment is intended as the space identified between two adjacent shelves, i.e., the area where the cultivations are included and grown.

Given the movement of the shelves, the doors can be made for example through a closure by means of a folding curtain which can extend and contract as desired as a function of the height of the compartment.

As will be apparent from the illustration of some embodiments, such a configuration allows to create a front closure of each compartment, which facilitates the maintenance of a certain microclimate.

Furthermore, for cultivations which require a dark environment, such as for example the cultivation of fungi, blackout doors can be included.

These and other features and advantages of the present invention will become clearer from the following description of some exemplary embodiments illustrated in the attached drawings in which.

It is specified that the figures attached to the present patent application show only some possible embodiments of the system for the vegetable garden and nursery cultivation of plants object of the present invention to better understand its advantages and features described.

Such embodiments are therefore to be intended for purely illustrative and non-limiting purpose to the inventive concept of the present invention, i.e., that of obtaining a system which allows to cultivate plants while optimising the necessary volume and limiting the consumption of energy.

Figure 1A:
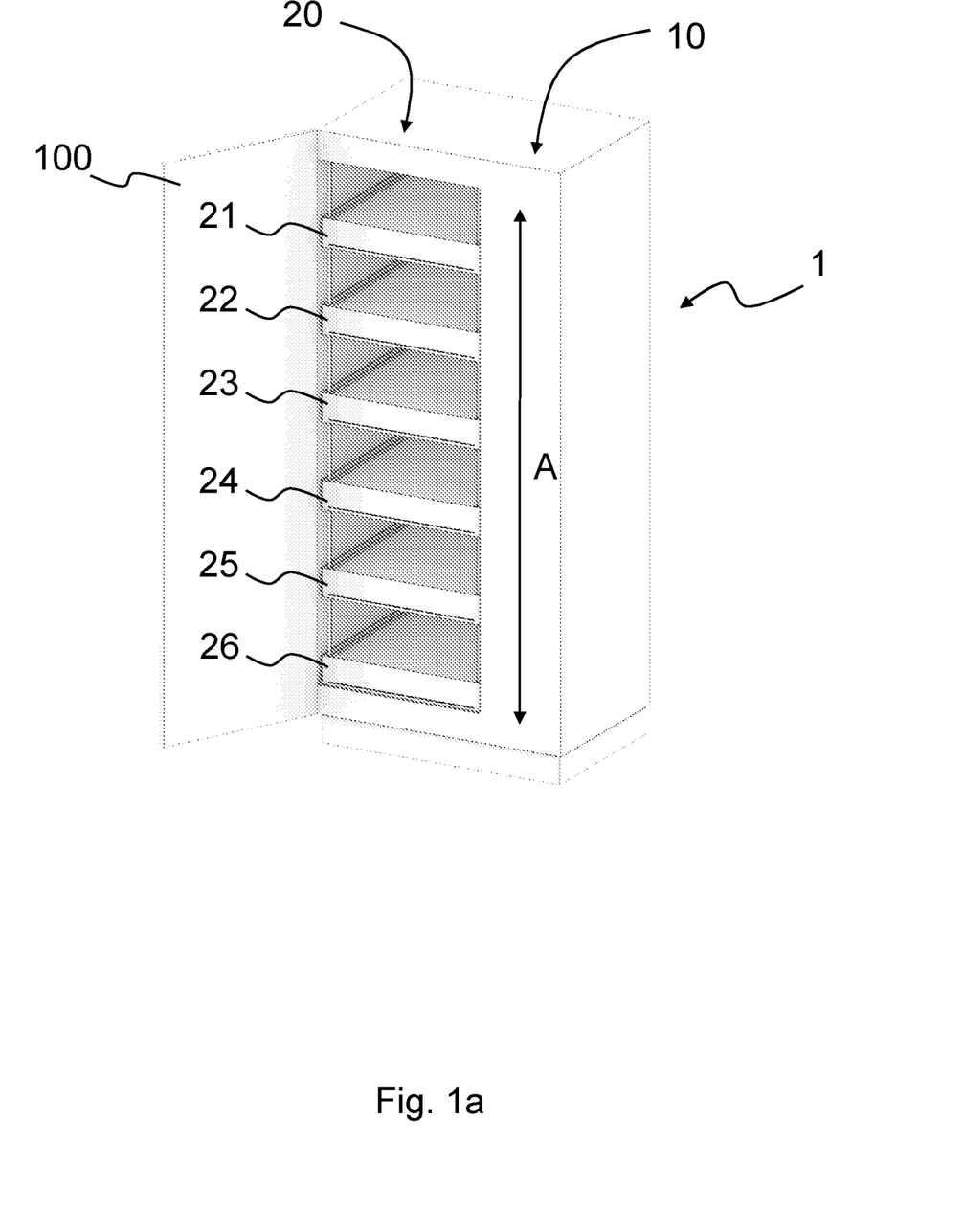
FIGS. 1a to 1e show some views of an embodiment of the system object of the present invention.

With particular reference to FIG. 1a, the system comprises a cabinet 1 divided into two compartments 10 and 20.

The compartment 20 is intended for the housing and cultivating plants, while the compartment 10 comprises auxiliary means for the optimal cultivation of such plants.

The compartment 20 comprises a plurality of shelves 21, 22, 23, 24, 25, and 26 positioned one above the other, along the vertical axis of the cabinet, so as to identify a space interposed between the top face of a shelf and the bottom face of the overlying shelf.

Figure 1B:
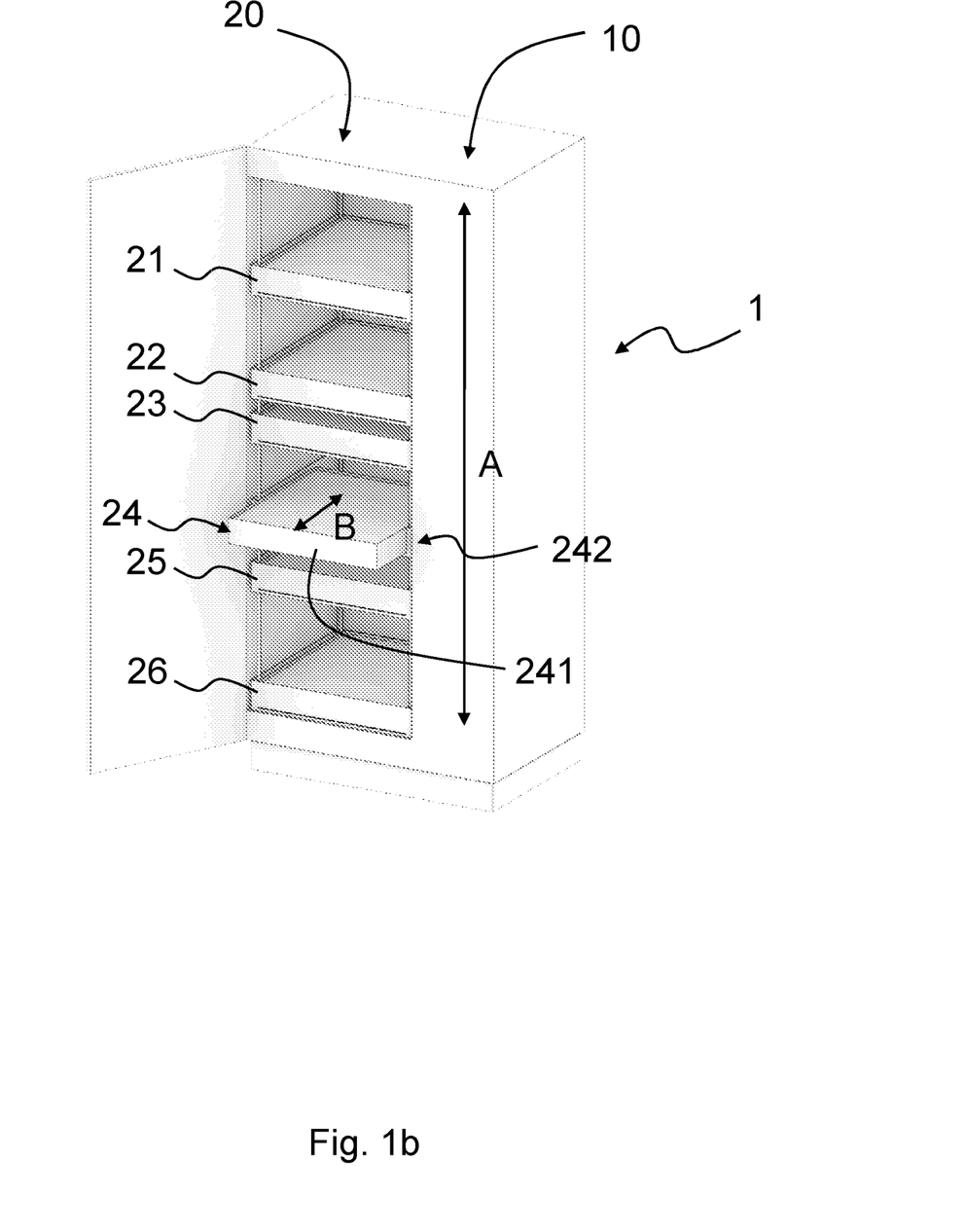
Figure 1C:
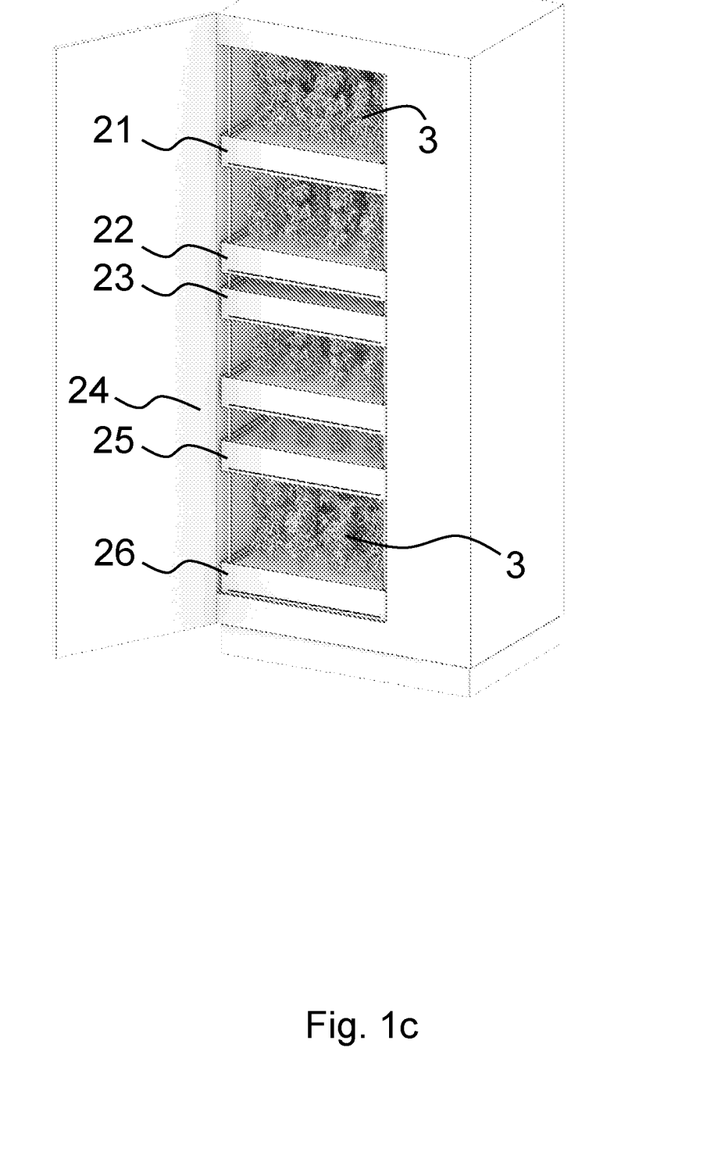

Placed on each shelf 21-26, the plants can thus grow inside the space interposed between the various shelves, as shown in FIG. 1c.

The cabinet 1 further comprises means for generating a light source, means for delivering a liquid and means for sucking/supplying a forced air flow.

As will be described in the following, such means are divided for each shelf 21-26, so that the space identified by the overlapping of each shelf 21-26 can have different climatic conditions.

It follows that between the shelf 21 and the shelf 22 there will be an area with a certain degree of humidity and temperature, as well as in the area between the shelf 21 and the top wall of the compartment 20, as well as between the real remaining shelves 22-26.

The operation of the light source generation means, the liquid delivery means and the forced air flow suction/supply means is regulated by a control unit located inside the compartment 10.

The control unit further controls the operation of the movement means of the shelves 21-26 along the vertical axis.

The shelves 21-26 can therefore move away from/approach each other, according to the direction indicated by the arrows A.

The movement means can be obtained in any manner known in the state of the art.

For example, an activation motor can be provided inside the compartment 10 which drives a slide/rail system for moving the shelves 21-26.

Each shelf can have one or more slides which slide inside rails obtained on the walls of the compartment 20.

Figure 1D:
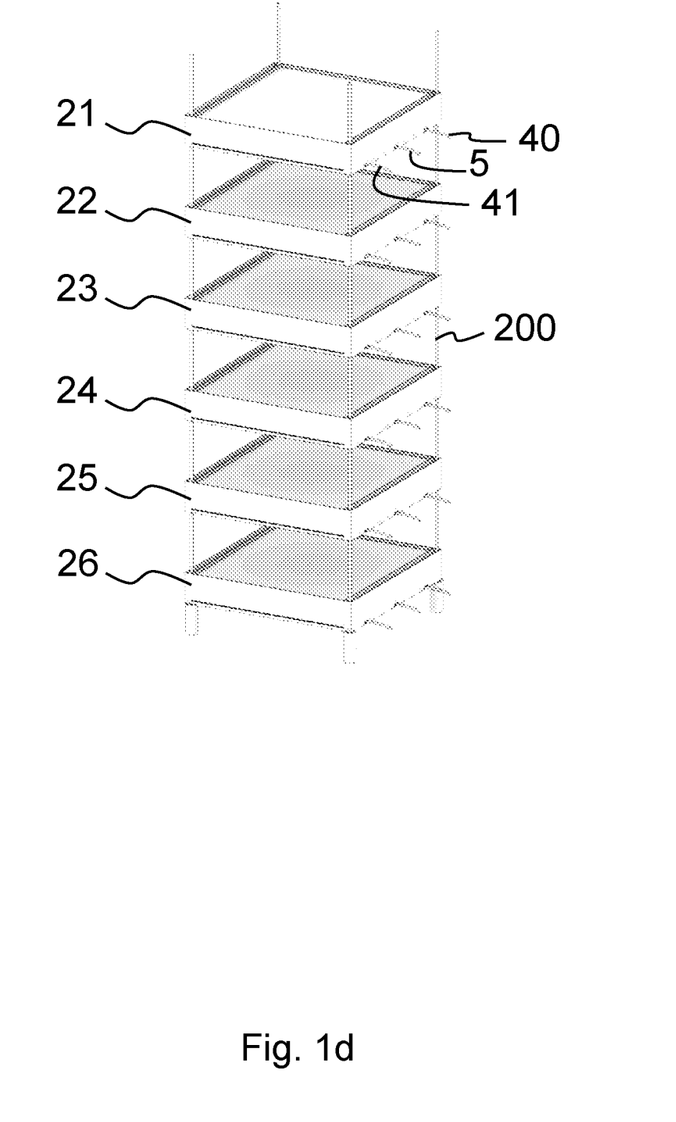

Alternatively, an endless screw system can be provided, i.e., the shelves 21-26 can slide on four columns 200, one per corner, as shown in FIG. 1d.

Regardless of the embodiment of the movement means, the shelves 21-26 can move along the vertical axis, so as to increase/decrease the volume between each shelf and facilitate plant growth.

For example, a possible configuration can be that illustrated in FIGS. 1b and 1c, in which the shelf 23 approaches the shelf 22 and the shelf 25 approaches the shelf 24.

The movement of the shelves can be set by a user or can be automated.

In fact, it is possible to include that a user sets the type of plants he wants to cultivate and the system positions the shelves 21-26 in order to optimise the volume occupied internally.

In order to optimise the occupied volume, it will be preferable to alternate not only the type of plants, but also to diversify the initial phases of each plant, so as to insert as many shelves 21-26 as possible.

FIG. 1c illustrates such a condition, where the shelves 21, 22 and 26 have plants 3 in the final cultivation phase, which need a greater height, while the shelf 23 has plants 3 in the initial cultivation phase, which thus need lower heights.

The shelves 21-26 can be included fully removable, so as to increase or decrease the number of shelves inside the compartment.

With particular reference to FIG. 1b, preferably the shelves consist of two parts, i.e., a tank element and a support frame, which have a relative movement therebetween.

The shelf 24 of FIG. 1b illustrates such a configuration: the tank element 241 moves horizontally with respect to the support frame 242.

In particular, the support frame 242 and the tank element 241 move simultaneously during the vertical translation of the shelf 24, while the tank element 241 can move in the direction indicated by the arrow B, with respect to the support frame 242.

Since the plants to be cultivated are positioned inside the tank element 241, the translation in the direction of the arrow B facilitates the user who must position the plants.

Each shelf can be responsible for adjusting the climatic conditions of the plants cultivated in the shelf below, whereby the light intensity, forced air flow and liquid delivery are carried out at the bottom face of each shelf 21-26.

According to a possible embodiment, the liquid delivery can be carried out shelf by shelf, so that the delivery does not occur in the shelf below.

According to such an organisation, the shelf 25 will have liquid delivery means to spray the shelf 25 itself, while it will be responsible for the brightness and air recirculation of the shelf 26, i.e., the shelf below.

Such a configuration can apply to the other shelves.

Figure 1E:
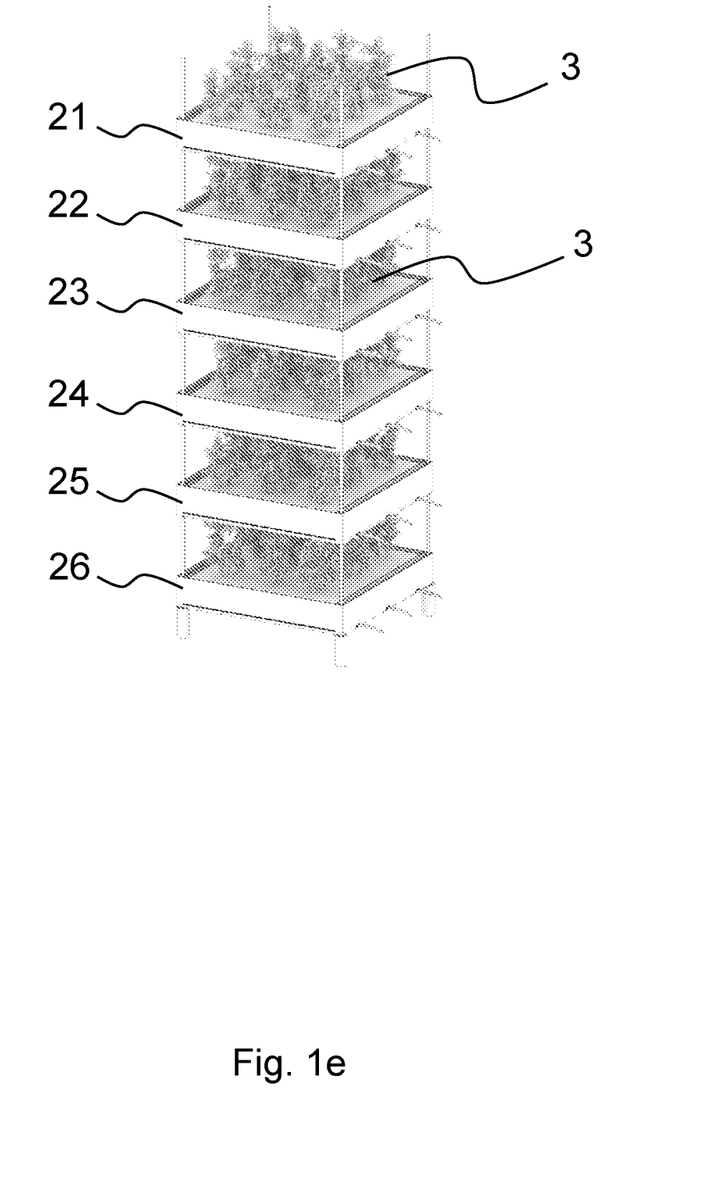

As illustrated in FIGS. 1d and 1e, each shelf has three connections 40, 41 and 5, which allow to transfer forced air, liquid and the generated electric current inside the compartment 10 to the shelves, by special means, as will be described in the following.

Advantageously, the compartment 10 has a door 100 turned to frontally cover the compartment 10, so as to isolate all the cultivations of the shelves 21-26.

Alternatively or in combination with such a door 10, it is possible to include a door for each shelf 21-26, so as to completely isolate each sub-compartment, i.e., each area delimited by two adjacent shelves.

The door opening can be manual or automated.

The doors can also consist of material not transparent to light radiation, so as to recreate a dark cultivation environment.

The door 10 can also be made of transparent material, so as to be able to control the evolution of the cultivations without the need to open the door 100.

It is thereby possible to monitor the progress of cultivations which require a dark environment, as it will be possible to temporarily open the individual doors and control the cultivations.

Alternatively, or in combination, each compartment can have a camera to remotely monitor the growth phase of the individual crops without the need to access the compartment. This also allows to have a door 10 made of opaque material, useful in some cases to reduce the lighting coming from the outside, for example, with the installation of the device in sunny places.

FIGS. 2a to 2d illustrate four views of a possible embodiment of the shelves 21-26.

Figure 2A:
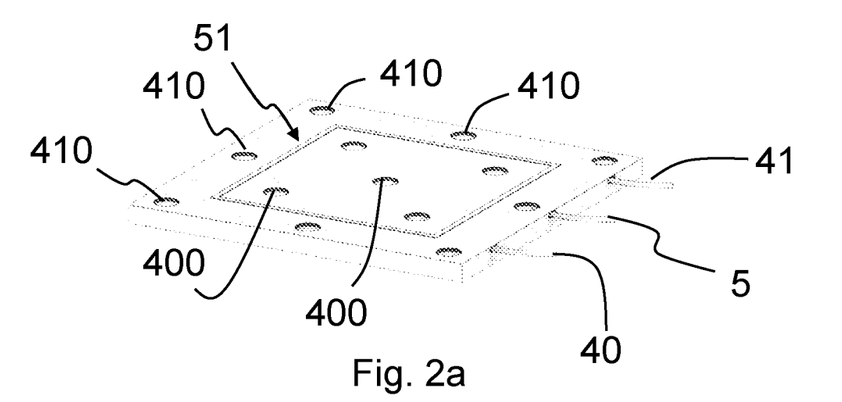
FIGS. 2a to 2d show two views of a possible embodiment of the shelf belonging to the system object of the present invention.
Figure 2B:
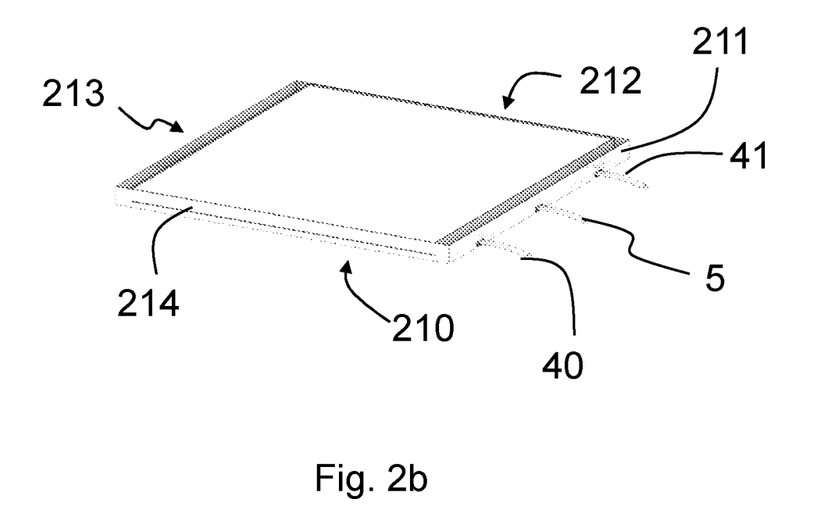
Figure 2C:
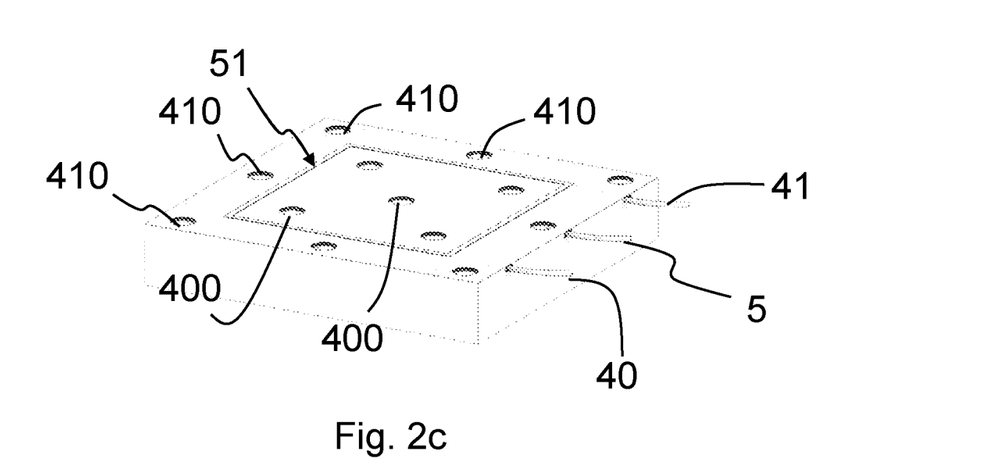
Figure 2D:
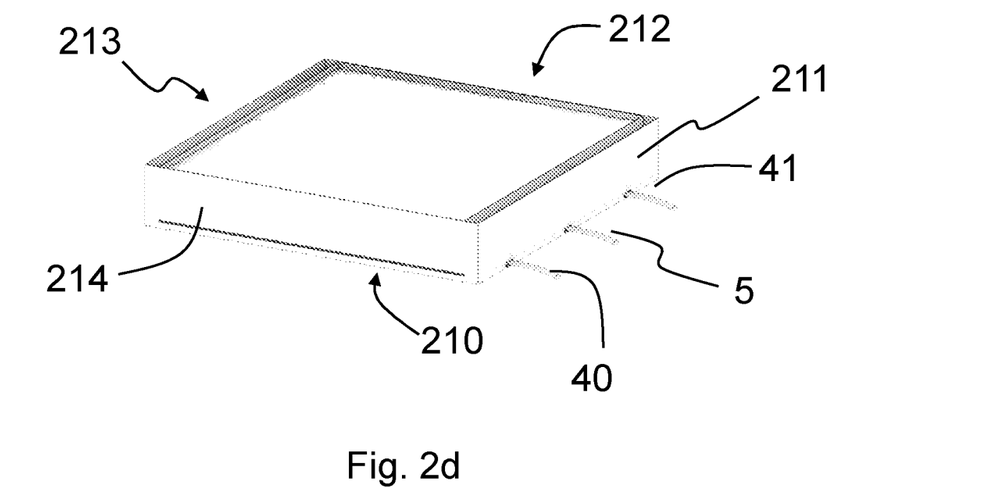

The shelves 21-26 are made in the same manner, but for the sake of simplicity only one shelf is shown, for example the shelf 21, and in FIGS. 2a and 2c the lower face is illustrated, while in FIGS. 2b and 2d the upper face is illustrated.

As described previously, each shelf comprises a tank element and a support frame.

The support frame comprises a double bottom 210 which has space in which to house part of the connections 40, 41 and 5.

The light source generation means, the liquid delivery means and the forced air flow suction/supply means are partly housed inside such double bottom 210.

Such a configuration will be described specifically for each means.

In particular, the forced air flow suction/supply means comprise two separate circuits, an introduction circuit and a suction circuit, connected to pumping means.

The pumping means are preferably positioned inside the compartment 10 and from such a compartment communicate with each shelf, respectively through an introduction pipe 40 and a suction pipe 41.

The pipe 40 and the pipe 41 are partly housed inside the double bottom 210 and the part of the pipes which is not housed has a length such as to allow the track of each shelf along the entire height of the cabinet 1.

The same applies to the connection 5, which will be described in the following.

The bottom of each shelf has holes 400 and 410 connected to the introduction pipe 40 and the suction pipe 41, respectively.

As a result, the air which will be introduced into the underlying shelf will exit the holes 40, while the air from the underlying shelf will be sucked out of the holes 41.

By adjusting the air temperature and speed, together with the introduction/suction, it is possible to control the temperature and humidity at the plants inserted in the area below the shelf.

The lower wall of the shelf 21 further has an insertion seat 51, intended to house one or more lighting devices, such as a strip of LED lights.

In this case, therefore, the light source generation means comprise a connection cable 5 of an electricity power generation unit to the LED strip.

The electricity generation source can consist of a simple connection to a power outlet and/or can comprise a battery.

Regardless of the power supply, the connection cable 5 is partly housed inside the double bottom 210 and is connected to the LED strip housed inside the insertion seat 51.

As instead regards the liquid delivery means, preferably a delivery pipe is included connected to one or more nozzles.

The delivery pipe transfers to the various shelves a liquid which is present inside a tank inserted in the compartment 10: again it is preferable to include pumping means for pumping the liquid inside the delivery pipe.

It can be included that the liquid will be delivered in drops, droplets or sprays, depending on the needs of the plants to be cultivated.

The liquid delivery form can also vary based on the positioning of such nozzles, in that as described, such nozzles can spray the underlying shelf or the shelf itself on which they are installed.

According to the variant shown in the figure, the delivery pipe is included inside the connection cable 5, so as to decrease the number of cables passing between the compartment 10 and the compartment 20.

The delivery nozzles are instead included at the insertion seat 51 of the LED strip.

With particular reference to FIGS. 1a and 2a, the lower wall of the shelf 21 will suck/introduce air through the holes 40 and 41, generate light and liquid through the insertion seat 51 into the tank element of the shelf 22, and so on for all the shelves.

With regard to the tank element of the shelf 21, the holes 40, 41 and the insertion seat 51 will be included in the top wall of the compartment 20.

It is evident how the operation just described can be automated:

the control unit present inside the compartment 10 can communicate with a plurality of sensors which monitor, for each shelf, the height, humidity, temperature and brightness of the plants cultivated thereon.

The control unit collects all the information and together with the information related to the type of plants cultivated, manages the operation of the entire cabinet 1, moving the shelves 21-26 according to the plant development phase.

Lastly, FIGS. 2a to 2d illustrate a peculiar embodiment of the shelf.

In fact, the tank element of the shelf 21 has the side walls 211-214 extendable in height, so that the side walls pass from a retracted condition, FIG. 2b, to an extracted condition, FIG. 2d.

It is evident that the extension of the side walls allows to increase the space of each tank element in which to accommodate the soil necessary for the cultivation of plants.

Generally, in the initial growth phase where little soil is required, the side walls 211-214 are in a retracted condition, while in the subsequent development phases, the side walls 211-214 are in an extracted condition.

Advantageously, the soil is provided in lyophilised form contained inside one or more containers consisting of water-soluble polymeric material.

Preferably three layers of soil are included, contained in three different containers.

In the upper layer, the soil with the seeds of the plant to be cultivated is included, while in the subsequent layers, simply soil is included.

During a first step, the upper layer is wetted by the nozzles of the upper shelf, the polymer material dissolves, the lyophilised soil is hydrated and expands in volume.

At the same time the seeds germinate and the first plants grow.

If there is a need for additional soil, additional water is dispensed which dissolves the container of the second layer of soil and so on.

An increase in the height of the side walls 211-214 is preferable to any increase in the volume of the soil, so as to correctly contain the soil.

Finally, it should be noted that the transition from the retracted condition to the extracted condition can be carried out in an "active" manner, i.e., by including means which make the walls translate one on the other, in any of the manners known in the state of the art.

Alternatively or in combination, the translation can occur in a "passive" manner, i.e., the increase in the soil volume can push the walls so as to move them from the retracted condition to the extracted condition.

For example, the walls can be provided with abutment surfaces which are pushed by the increased soil volume to translate the walls one on the other.

While the invention is susceptible to various modifications and alternative constructions, some preferred embodiments have been shown in the drawings and described in detail.

It should be understood, however, that there is no intention of limiting the invention to the specific illustrated embodiment but, on the contrary, it aims to cover all the modifications, alternative constructions, and equivalents falling within the scope of the invention as defined in the claims.

The use of "for example", "etc.", "or" refers to non-exclusive non-limiting alternatives, unless otherwise stated.

The use of "includes" means "includes but not limited to", unless otherwise stated.

The invention claimed is:

1. A system for vegetable garden and nursery cultivation of plants, comprising:

a cabinet, wherein a plurality of shelves are provided on which to cultivate plants, the shelves being positioned one on top of the other along a vertical axis, so as to define a space interposed between an upper face of a respective shelf and a lower face of a respective overlying shelf, which space is adapted to cultivate the plants;

means for generating a light source, means for delivering a liquid, means for sucking/supplying a forced air flow, and means for moving the plurality of shelves along the vertical axis;

at least one sensor adapted to detect a height of a cultivated plants on each shelf, the at least one sensor configured to detect at least one of a brightness, a temperature, and a humidity inside the space interposed between the shelves; and a control unit configured to control operation of the means for generating the light source, the means for delivering the liquid, the means for sucking/supplying the forced air flow, and the means for moving the plurality of shelves along the vertical axis.

2. The system according to claim 1, wherein the movement means comprise one or more slides integral with the shelves that slide along corresponding tracks provided in walls of the cabinet.

3. The system according to claim 1, wherein the shelf comprises a tank element comprising a double bottom, which double bottom includes a lower wall with a plurality of holes suitable for the introduction/suction of air and nozzles suitable for delivering liquid in the area below the shelf.

4. The system according to claim 3, wherein the forced air flow introduction/suction means comprise pumping means connected to one or more introduction/suction pipes which are partly housed inside the double bottom that are in communication with the holes suitable for the introduction/suction of air.

5. The system according to claim 4, further comprising at least one introduction pipe and at least one suction pipe connected to corresponding introduction holes and suction holes.

6. The system according to claim 3, wherein the light source generation means comprise a connection cable of an electricity generation unit to one or more lighting devices, the connection cable being partly housed inside the double bottom and the lower wall comprising an insertion seat of the one or more lighting devices.

7. The system according to claim 3, wherein the liquid delivery means comprise a delivery pipe connected to the nozzles partly housed inside the double bottom, the nozzles being positioned at an insertion location.

8. The system according to claim 3, wherein the tank element comprises at least one layer of lyophilised soil contained within a container of water-soluble polymeric material.

9. The system according to claim 3, wherein the tank element has one or more extendable walls.

10. The system according to claim 1, wherein the control unit is configured to control operation of the means for generating the light source, the means for delivering the liquid, the means for sucking/supplying the forced air flow, and the means for moving the plurality of shelves along the vertical axis based at least in part on at least one of: the humidity, the temperature, and the brightness.

11. A method for cultivating plants, comprising:

providing a cabinet having a plurality of shelves on which to cultivate plants, the shelves being positioned one on top of the other along a vertical axis, so as to define a space interposed between an upper face of a respective shelf and a lower face of a respective overlying shelf, which space is adapted to cultivate the plants;

providing means for generating a light source, means for delivering a liquid, means for sucking/supplying a forced air flow, and means for moving the plurality of shelves along the vertical axis;

providing at least one sensor adapted to detect a height of a cultivated plants on each shelf, the at least one sensor configured to detect at least one of a brightness, a temperature, and a humidity inside the space interposed between the shelves; and controlling operation, by a control unit, of the means for generating the light source, the means for delivering the liquid, the means for sucking/supplying the forced air flow, and the means for moving the plurality of shelves along the vertical axis.

12. The method according to claim 11, wherein the movement means comprise one or more slides integral with the shelves that slide along corresponding tracks provided in walls of the cabinet.

13. The method according to claim 11, wherein the shelf comprises a tank element comprising a double bottom, wherein the double bottom comprises a lower wall with a plurality of holes adapted for the introduction/suction of air and nozzles adapted for delivering liquid in the area below the shelf.

14. The method according to claim 13, wherein the forced air flow introduction/suction means comprise pumping means connected to one or more introduction/suction pipes which are partly housed inside the double bottom that are in communication with the holes.

15. The method according to claim 14, further comprising providing at least one introduction pipe and at least one suction pipe connected to corresponding introduction holes and suction holes.

16. The method according to claim 13, wherein the light source generation means comprise a connection cable of an electricity generation unit to one or more lighting devices, the connection cable being partly housed inside the double bottom and the lower wall comprising an insertion seat of the one or more lighting devices.

17. The method according to claim 13, wherein the liquid delivery means comprise a delivery pipe connected to the nozzles partly housed inside the double bottom, the nozzles being positioned at an insertion location.

18. The method according to claim 13, wherein the tank element comprises at least one layer of lyophilised soil contained within a container of water-soluble polymeric material.

19. The method according to claim 13, wherein the tank element has one or more extendable walls.

20. The method according to claim 11, wherein the control unit is configured to control operation of the means for generating the light source, the means for delivering the liquid, the means for sucking/supplying the forced air flow, and the means for moving the plurality of shelves along the vertical axis based at least in part on at least one of: the humidity, the temperature, and the brightness.

* * * * *